(12) United States Patent
Weh et al.

(10) Patent No.: US 12,252,103 B2
(45) Date of Patent: Mar. 18, 2025

(54) HYDRAULIC BLOCK FOR A HYDRAULIC POWER BRAKE SYSTEM

(71) Applicant: Robert Bosch GmbH, Stuttgart (DE)

(72) Inventors: Andreas Weh, Sulzberg (DE); Florian Breyer, Oberstaufen (DE); Martin Hagspiel, Rettenberg (DE); Matthias Mayr, Rettenberg (DE); Stefan Kaserer, Ofterschwang (DE); Tobias Franke, Missen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/549,044

(22) PCT Filed: Jul. 13, 2022

(86) PCT No.: PCT/EP2022/069608
§ 371 (c)(1),
(2) Date: Sep. 5, 2023

(87) PCT Pub. No.: WO2023/046329
PCT Pub. Date: Mar. 30, 2023

(65) Prior Publication Data
US 2024/0149857 A1 May 9, 2024

(30) Foreign Application Priority Data
Sep. 27, 2021 (DE) .................. 10 2021 210 766.4

(51) Int. Cl.
*B60T 17/08* (2006.01)
*F15B 15/14* (2006.01)
(Continued)

(52) U.S. Cl.
CPC .......... *B60T 17/08* (2013.01); *F15B 15/1428* (2013.01); *B60T 8/4018* (2013.01); *B60T 15/00* (2013.01)

(58) Field of Classification Search
CPC ......... B60T 17/08; B60T 8/4018; B60T 15/00
See application file for complete search history.

(56) References Cited

U.S. PATENT DOCUMENTS 10,053,073 B2 * 8/2018 Weh ................. B60T 8/409
10,919,510 B2 * 2/2021 Alili ................ B60T 13/745
(Continued)

FOREIGN PATENT DOCUMENTS

DE 102019210797 A1 * 1/2021 ........... B60T 8/4081
DE 102019212356 A1 2/2021
(Continued)

OTHER PUBLICATIONS

International Search Report for PCT/EP2022/069608, Issued Nov. 22, 2022.

*Primary Examiner* — Thomas E Lazo
(74) *Attorney, Agent, or Firm* — NORTON ROSE FULBRIGHT US LLP; Gerard A. Messina

(57) ABSTRACT

To extend a power cylinder bore in a hydraulic block of a power brake system, a cylinder cover, which is in the form of a cylinder tube and is closed at one end, is fastened by means of a circumferential caulking in a fastening groove of the hydraulic block which encloses the power cylinder bore. An interference fit of a fastening flange of the cylinder cover in the fastening groove reliably seals the cylinder cover against the hydraulic block in a pressure-proof manner.

11 Claims, 3 Drawing Sheets

(51) Int. Cl.
 *B60T 8/40* (2006.01)
 *B60T 15/00* (2006.01)

(56) References Cited

U.S. PATENT DOCUMENTS

| | | | |
|---|---|---|---|
| 2008/0251335 A1 | 10/2008 | Reiner et al. | |
| 2017/0030445 A1* | 2/2017 | Weh | F15B 15/14 |
| 2017/0137005 A1* | 5/2017 | Weh | F04B 23/025 |
| 2018/0345934 A1* | 12/2018 | Weh | B60T 8/4018 |
| 2021/0206363 A1* | 7/2021 | Weh | B60T 17/08 |
| 2021/0254713 A1 | 8/2021 | Kaserer et al. | |
| 2022/0379861 A1* | 12/2022 | Weh | B60T 8/4081 |

FOREIGN PATENT DOCUMENTS

| | | | |
|---|---|---|---|
| DE | 102019218513 A1 * | 6/2021 | B60T 13/12 |
| WO | 2021104790 A1 | 6/2021 | |
| WO | WO-2021104783 A1 * | 6/2021 | B60T 13/12 |

\* cited by examiner

HYDRAULIC BLOCK FOR A HYDRAULIC POWER BRAKE SYSTEM

FIELD

The present invention relates to a hydraulic block for a hydraulic unit for a hydraulic power brake system for a motor vehicle.

BACKGROUND INFORMATION

Hydraulic blocks of this general type are convention. These hydraulic blocks comprise a power cylinder or a power cylinder bore, in which a power piston can be displaced axially to generate hydraulic power brake pressure. To move the power piston, an electric motor is typically disposed on the hydraulic block, which, preferably with the interposition of a mechanical reduction gear, moves the power piston axially in the power cylinder or the power cylinder bore via a worm gear.

PCT Patent Application No. WO 2021/104 790 A1 describes such a hydraulic block which, to extend the power cylinder bore, comprises a cylindrical tube-shaped molding which is formed in one piece with the hydraulic block, projects from the hydraulic block coaxially to the power cylinder bore and is closed at its end that projects from the hydraulic block.

PCT Patent Application No. WO 2021/104 783 A1 likewise describes such a hydraulic block, which comprises a power cylinder bore that is extended by means of a cylindrical-tube shaped bushing which protrudes from the power cylinder bore on one side of the hydraulic block and is closed at its protruding end.

SUMMARY

A hydraulic block according to the present invention is provided for a hydraulic unit of a hydraulic power brake system.

To generate hydraulic power brake pressure, the hydraulic block according to an example embodiment of the present invention comprises a power cylinder bore, which can also be regarded as a power cylinder and which is open on a first side of the hydraulic block. The first side of the hydraulic block, which will also be referred to in the following as the motor side, is provided for fastening an electric motor for displacing a power piston in the power cylinder bore, for example via a worm gear as a rotation/translation converter gear, optionally with the interposition of a reduction gear. The displacement of the power piston in the power cylinder bore forces brake fluid out the power cylinder bore and generates power brake pressure.

To extend the power cylinder bore, a tubular cylinder cover is disposed on a second side of the hydraulic block opposite to the first side and is connected to the hydraulic block in a fluid-tight and pressure-proof manner by means of a circumferential caulking. One end of the cylinder cover away from the hydraulic block is in particular configured to be closed, so that the cylinder cover not only extends the power cylinder bore but also closes it at a distance from the hydraulic block. "Fluid-tight" in particular means that no brake fluid escapes from the cylinder cover and from the power cylinder bore in the region in which the cylinder cover is connected to the hydraulic block. "Pressure-proof" means that the connection of the cylinder cover to the hydraulic block can withstand a maximum hydraulic pressure prevailing in the cylinder cover and the power cylinder bore without brake fluid escaping.

The hydraulic block is used for mechanical fastening and hydraulic interconnection of hydraulic components of the vehicle brake system, brake pressure generation and/or brake pressure control and/or slip control. The hydraulic components are fastened in the receptacles in the hydraulic block, which are typically configured as cylindrical counterbores, blind holes or through-holes, in part with diameter gradations. "Interconnected" means that the receptacles or the hydraulic components fastened in them, are connected by lines in the hydraulic block in accordance with a hydraulic circuit diagram of the vehicle brake system. The lines are typically, but not necessarily, drilled into the hydraulic block.

The hydraulic block fitted with the hydraulic components forms the hydraulic unit, wherein "fitted" means that the hydraulic components are fastened in the receptacles of the hydraulic block respectively provided for them.

Developments and advantageous embodiments of the present invention are disclosed herein.

All features disclosed in the description and figures can be implemented individually or in fundamentally any combination in embodiments of the present invention. Embodiments of the present invention which do not comprise all but only one or more features of an embodiment of the present invention are possible in principle.

BRIEF DESCRIPTION OF THE DRAWINGS

The present invention is explained in more detail in the following with reference to an example embodiment shown in the figures.

The figures are simplified and schematic illustrations to clarify and understand the present invention.

DETAILED DESCRIPTION OF EXAMPLE EMBODIMENTS

Figure 1:
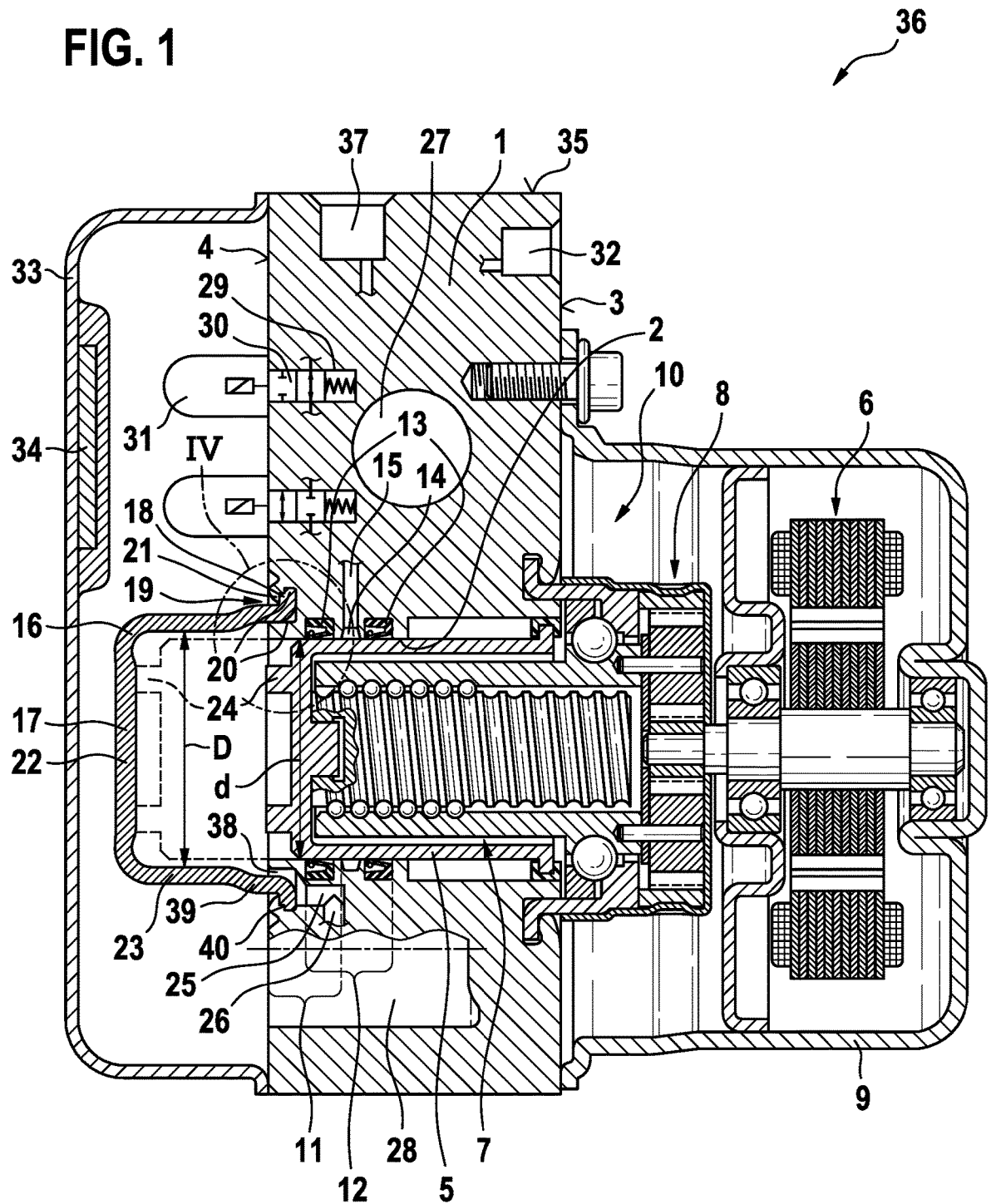
FIG. 1 shows a section of a hydraulic block according to an example embodiment of the present invention in an axial plane of a power cylinder bore.

FIG. 1 shows a section of a hydraulic block 1 according to the present invention for a hydraulic unit 36 of an otherwise not depicted hydraulic power brake system. The sectional plane is an axial plane of a power cylinder bore 2 that passes through the hydraulic block 1 from a first side 3 to an opposite second side 4. In this embodiment example, the hydraulic block 1 is a flat, cuboid metal block used for mechanical fastening and hydraulic interconnection of hydraulic components of the power brake system. The hydraulic block 1 fitted with the hydraulic components forms the hydraulic unit 36 of the vehicle brake system. "Flat" means that hydraulic block 1 is about three to four times as wide or long as it is thick. The first and the second side 3, 4, through which the power cylinder bore 2 passes, are two opposite large sides of the hydraulic block 1 that are nearly square in this embodiment example.

A power piston 5, which can be displaced axially in the power cylinder bore 2 by means of an electric motor 6 via a worm gear 7 as a rotation/translation converter gear, is disposed in the power cylinder bore 2 to generate hydraulic power brake pressure. The embodiment example uses a ball screw drive as a worm gear 7. In this embodiment example, a planetary gear 8 is disposed between the electric motor 6 and the worm gear 7 as a mechanical reduction gear.

The electric motor 6, the planetary gear 8, the worm gear 7 and the power piston 5 are disposed on the hydraulic block 1 coaxially to the power cylinder bore 2 and the electric motor 6 is fastened to the outside of the first side 3 of the hydraulic block 1, which can therefore also be referred to as the motor side of the hydraulic block 1. On the first side 3, or the motor side, the power cylinder bore 2 is open. The planetary gear 8 is located in a motor housing 9 of the electric motor 6. The worm gear 7 projects into the power cylinder bore 2 and into the power piston 5, the open side of which faces the electric motor 6 and which is embodied as a hollow piston in order to accommodate the worm gear 7.

The electric motor 6, the planetary gear 8 and the worm gear 7 form a power drive for the power piston 5 and, together with the power piston 5 and the power cylinder bore 2, form a power brake pressure generator 10 for the not depicted hydraulic power brake system.

The power cylinder bore 2 that forms a power cylinder may also be regarded as a plunger or plunger cylinder and the power piston may be regarded as a plunger piston.

Near the second side 4 of the hydraulic block 1, the power cylinder bore 2 comprises a section having a slightly smaller diameter that forms a guide section 11 which guides the power piston 5 in the power cylinder bore 2 in an axially displaceable manner.

In the guide section 11, the power cylinder bore 2 comprises a circumferential first groove and, offset in the direction of the first side 3 or the motor side of the hydraulic block 1, a second groove in which a respective sealing ring is disposed as a piston seal 13, thus forming a sealing section 12 in which the power cylinder piston 5 is sealed in the power cylinder bore 2. The sealing section 12 and the guide section 11 overlap one another in the region of the first groove. The guide section 1 extends further in the direction of the second side 4 of the hydraulic block 1 and the sealing section 12 extends further in the direction of the first side 3 or the motor side of the hydraulic block 1.

Between the two grooves with the piston seals 13, the power cylinder bore 2 comprises a third circumferential groove 14, into which a brake line 15 opens that connects the third groove 14 to a not depicted brake fluid reservoir disposed on a narrow side of the hydraulic block 1 which adjoins the first and the second side 3, 4 and is referred to here as the upper side 35 of the hydraulic block 1. The brake line 15 which connects the third groove 14 to the brake fluid reservoir is provided in the hydraulic block 1 by drilling or in another way and opens into the third groove 14. When the power piston 5 is in a starting position shown in the drawing, in which it is displaced back in the direction of the electric motor 6, the power cylinder bore 2 communicates with the not depicted brake fluid reservoir through the brake line 15 and the third groove 14. If the power piston 5 is displaced away from the electric motor 6 to generate brake pressure, it passes over the third groove 14 and thereby hydraulically separates the power cylinder bore 2 from the brake fluid reservoir.

In the upper side 35, the hydraulic block 1 comprises cylindrical blind holes as connections 37 for the not depicted brake fluid reservoir. When the brake fluid reservoir is placed onto the upper side 35 of the hydraulic block 1, connecting nipples on a base of the brake fluid reservoir enter the connections 37 of the hydraulic block 1 and are sealed there with O-rings.

On the second side 4 of the hydraulic block 1, a cylinder cover 16 is disposed coaxially to the power cylinder bore 2. In this embodiment example, the cylinder cover 16 which projects from the second side 4 of the hydraulic block 1 is cylindrical tube-shaped and, on an end that projects from the hydraulic block 1, comprises a cylinder cover base 17 which closes the cylinder cover 16 and the power cylinder bore 2 at that end.

An open end of the cylinder cover 16 is fastened to hydraulic block 1. For this purpose, the cylinder cover 16 comprises a circumferential and radially outward projecting fastening flange 18 at its open end, which is pressed into a fastening groove 19 that is provided in the second side 4 of the hydraulic block 1 and concentrically encloses a mouth of the power cylinder bore 2. The fastening groove 19 can also generally be regarded as a depression in the second side 4 of the hydraulic block 1, wherein depressions other than a circumferential groove, for example a circumferential annular step for fastening the cylinder cover 16 to the hydraulic block 1, are possible too (not shown).

The fastening flange 18 of the cylinder cover 16 is oversized in radial direction of the cylinder cover 16 and, with respect to a groove width of the fastening groove 19, to the power cylinder bore 2, such that the fastening flange 18 has an interference fit in the fastening groove 19 of the hydraulic block 1 and abuts circumferential groove side walls of the fastening groove 19 both radially on the inside and radially on the outside with mechanical pretension. The interference fit may also be referred to as a press fit.

Figure 4:
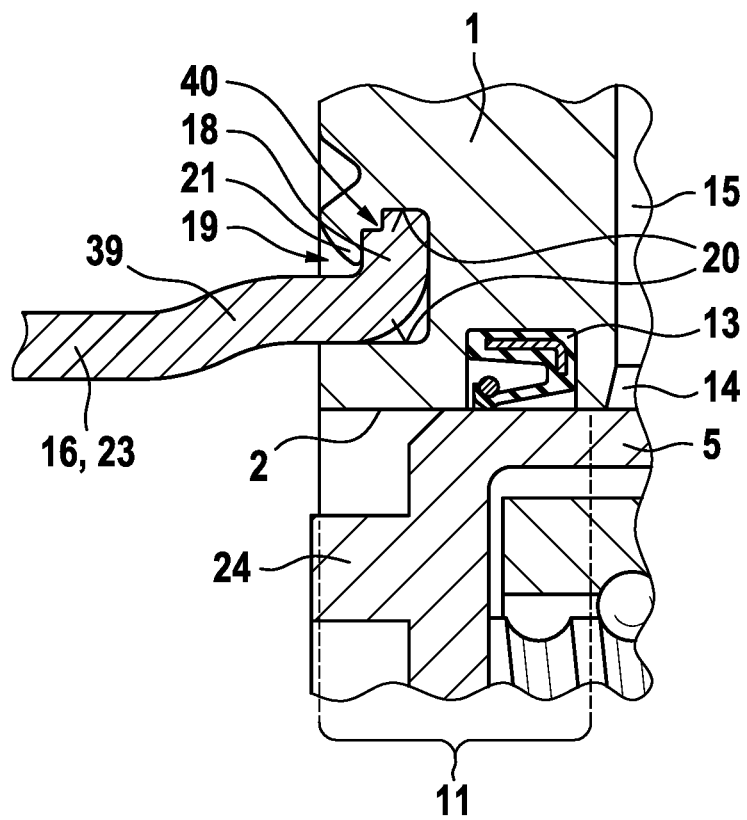
FIG. 4 shows an enlarged detail in accordance with the arrow IV in FIG. 1.

The hydraulic block 1 overlaps the fastening flange 18 of the cylinder cover 16 with a circumferential caulking 21 in such a way that the cylinder cover 16 is fastened to the hydraulic block 1. FIG. 4 shows an enlargement of the fastening groove 19, the fastening flange 18 and the caulking 21. The interference fit of the fastening flange 18 in the fastening groove 19 and the caulking 21 seal the cylinder cover 16 on the hydraulic block 1. The mechanical pretension with which an outer edge of the fastening flange 18 abuts an outer groove side wall of the fastening groove 19 in particular reliably seals the cylinder cover 16 on the hydraulic block 1. The mechanical pretension with which an inner edge of the cylinder cover 16 abuts an inner groove side wall 20 of the fastening groove 19 keeps the outer edge of the fastening flange 18 in abutment on the outer groove side wall of the fastening groove 19 with the mechanical pretension, thus ensuring sealing.

The radial pressing of the fastening flange 18 in the fastening groove 19 is created by the circumferential caulking 21. The caulking 21 compresses the material of the hydraulic block 1 surrounding the fastening groove 19 axially, as a result of which the material is plastically deformed radially inward. This narrows the fastening groove 19 in the hydraulic block 1 and radially clamps the fastening flange 18 of the cylinder cover 16 between the groove side walls of the fastening groove 19.

To further improve the sealing of the cylinder cover 16 on the hydraulic block 1, the fastening flange 18 of the cylinder cover 16 comprises a circumferential annular step 40 on an outer edge facing away from a base of the fastening groove 19. During caulking, the material of the hydraulic block 1 is also deformed into the annular step 40 of the fastening flange 18, which improves the seal.

In this embodiment example, the hydraulic block 1 is made of an aluminum alloy and the cylinder cover 16 is made of steel, i.e. the hydraulic block 1 has a greater coefficient of thermal expansion than the cylinder cover 16 and its fastening flange 18. This ensures the sealing of the cylinder cover 16 on the hydraulic block 1 even at high temperatures.

In this embodiment example, the cylinder cover 16 made of steel is produced by deep drawing, i.e, in general terms, by a forming process that enables different wall thicknesses. In order to make the cylinder cover base 17 stable, it has a greater wall thickness than a circumferential wall 23 of the cylinder cover 16. In addition, the cylinder cover base 17 can comprise one or more beads to stiffen it (not shown). In this embodiment example, the cylinder cover base 17 is configured to be somewhat recessed in the direction of the hydraulic block 1 to stiffen it (see the drawing). Generally speaking, the cylinder cover base 17 has a stiffening 22 as a result of one or more of the aforementioned measures.

On its end face facing the cylinder cover base 17, the power piston 5 comprises an annular web as an axial stop 24, with which the power piston 5 abuts the cylinder cover base 17 at the end of its displacement in the direction of the cylinder cover base 17. The axial stop 24 limits the axial displacement of the power piston 5 in the direction of the cylinder cover base 17. The axial stop 24, which is annular in this embodiment example, is disposed close to the edge of the circumferential wall 23 of the cylinder cover 16 in order to keep the bending stress on the cylinder cover base 17 low when the power piston 5 pushes against the cylinder cover base 17. "Close to the edge" means a radial distance from the circumferential wall 23 between about 20% to 30% of the diameter or less.

Figure 2:
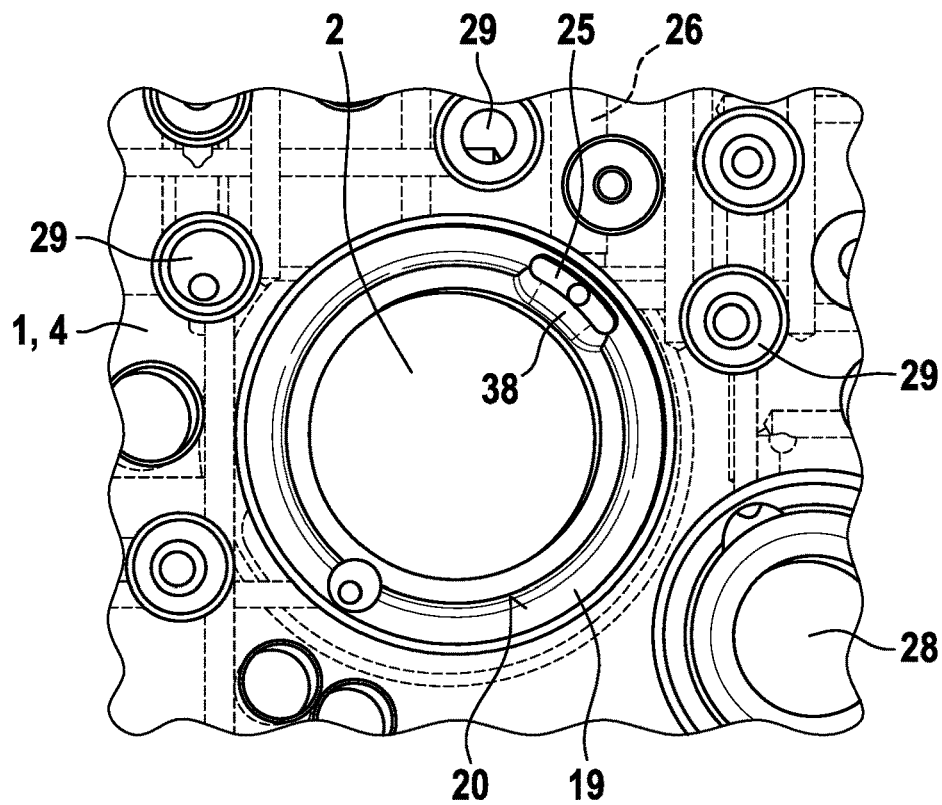
FIG. 2 shows an excerpt of the hydraulic block of FIG. 1 looking axially into a power cylinder bore.
Figure 3:
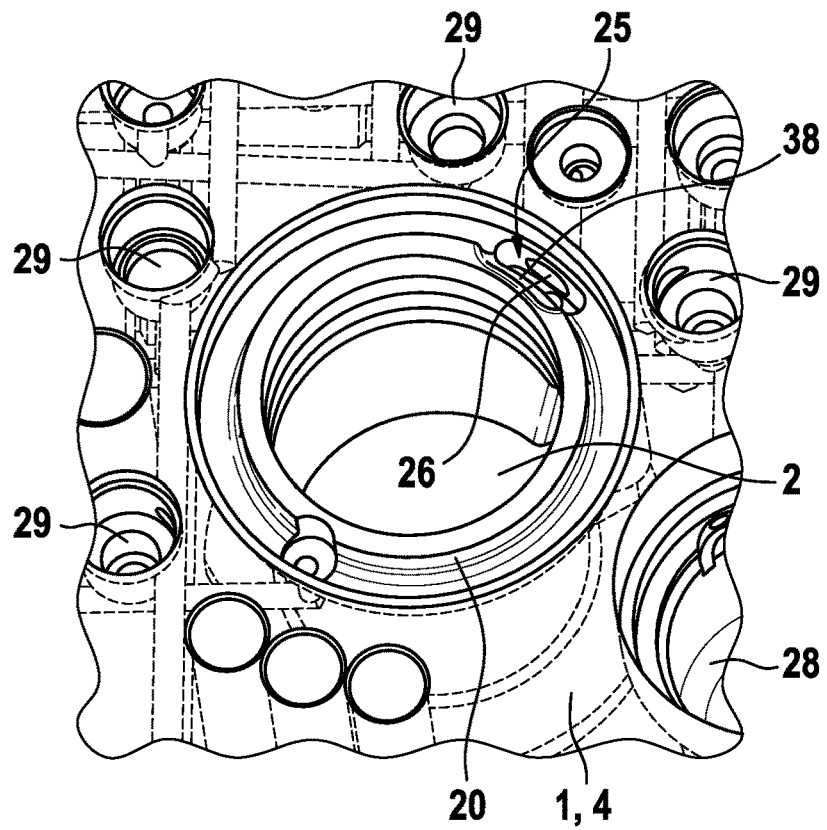
FIG. 3 shows the excerpt of the hydraulic block according to FIG. 2 in a perspective view.

At one location on the circumference, the hydraulic block 1 comprises a passage 25 from a brake line 26 into the fastening groove 19 for the cylinder cover 16, which is shown enlarged in FIGS. 2 and 3. The passage 25 in this embodiment example is embodied as an axially parallel blind hole in a base of the fastening groove 19 (see FIG. 2). In this embodiment example, the passage 25 has the form of an arcuate slot, which extends in a circumferential direction of the fastening groove 19 and a short distance in circumferential direction.

The slot which forms the passage 25 at the base of the fastening groove 19 is located outside one of the two grooves for the piston seals 13, i.e. a groove for a piston seal 13 closer to a mouth of the power cylinder bore 2 is located between the power cylinder bore 2, to which the groove is open, and the passage 25.

In order for the passage 25 to communicate with an interior space of the cylinder cover 16, an opening 38 on the inner groove side wall 20 of the fastening groove 19 leads obliquely from the interior space of the cylinder cover 16 into the fastening groove 19. To avoid edges that would increase flow resistance, the opening 38 is configured such that it is oblique to an imaginary axis of the power cylinder bore 2.

The slot at the base of the fastening groove 19 which forms the passage 25 is narrower than the fastening groove 19 such that a strip-shaped portion of the base of the fastening groove 19 remains between an outer edge of the passage 25 facing away from the power cylinder bore 2 and an outer groove side wall of the fastening groove 19 as a support for the fastening flange 18 of the cylinder cover 16.

An inner diameter D of the cylinder cover 16 is greater than the guide diameter and sealing diameter d of the power cylinder bore 2 in the guide section 11 and sealing section 12. The inner diameter D of the cylinder cover 16 is thus also greater than a diameter d of the power piston 5, as a result of which the interior space of the cylinder cover 16 communicates with the power cylinder bore 2. To further enlarge the inner diameter D of the cylinder cover 16, the circumferential wall 23 of the cylinder cover 16 has an in cross-section S-shaped diameter enlargement 23 in the direction of the open side facing the power cylinder bore 2.

The brake line 26 opens into the passage 25. It connects the brake fluid reservoir, which is placed on the upper side 35 of the hydraulic block 1, to the interior space of the cylinder cover 16. The brake line 26 leads directly from one of connections 37 for the not depicted brake fluid reservoir to the passage 25. In FIG. 1, the passage 25 and the brake line 26 are shown rotated downward into the sectional plane.

A check valve (not shown) through which flow can pass in the direction of the cylinder cover 16 is disposed in the brake line 26 such that, when the power piston 5 is displaced back in the direction of the electric motor 6, the power piston 5 can draw brake fluid into the cylinder cover 16 and into the power cylinder bore 2, but cannot force brake fluid out the power cylinder bore 2 in the direction of the brake fluid reservoir.

The bore arrangement of the hydraulic block 1 also connects the passage 25 to connections 32 for not depicted hydraulic wheel brakes of the power brake system, at which brake lines leading to the wheel brakes are connected to the hydraulic block 1. Depressions as connections 32 for the brake lines leading to the wheel brakes are provided in the first side 3 of the hydraulic block 1.

In this embodiment example, the hydraulic block 1 comprises a master brake cylinder bore 27 in which a primary or rod piston and, for a dual circuit brake system, a secondary or floating piston are disposed (not shown) such that brake pressure can also be generated with muscle power. The master brake cylinder bore 27 that forms a master brake cylinder is provided in the hydraulic block 1 perpendicular to the power cylinder bore 2 in a central plane between the first and the second side 3, 4 and parallel to the upper side 35 on which the brake fluid reservoir is placed.

A simulator cylinder bore 28 for a not depicted pedal travel simulator is provided in the hydraulic block 1 in the second side 4 of the hydraulic block 1 between the power cylinder bore 2 and an edge of the hydraulic block 1 away from the upper side 35. For space reasons, only a half-section of the simulator cylinder bore 28 is shown in FIG. 1. The pedal travel simulator comprises a not depicted spring-loaded simulator piston that is axially displaceable in the simulator cylinder bore 28. The pedal travel simulator communicates with the master brake cylinder bore 27 and enables brake fluid to be forced out of the master brake cylinder bore 27 when said master brake cylinder bore is disconnected from the power brake system by closing separator valves when brake pressure is generated with the power brake pressure generator 10.

In the second side 4 opposite to the first side 3 or motor side, the hydraulic block 1 comprises diameter-stepped depressions as receptacles 29 for the solenoid valves 30 and not depicted receptacles for other components such as pressure sensors. The solenoid valves 30, which are shown in simplified form as circuit symbols, and the other hydraulic components are used to regulate the brake pressure of the power brake system, wherein wheel-specific brake pressure control individually in each of the connected hydraulic wheel brakes is possible. Hydraulic sections of the solenoid valves 30 that form the actual valves are located in the receptacles 29, armatures and solenoid coils housed in a valve dome 31 and project from the second side 4, which can also be referred to as the valve side or control unit side of the hydraulic block 1.

A box-shaped cover 33, which covers the cylinder cover 16 and the valve domes 31 of the solenoid valves 30, is disposed on the second side 4 of the hydraulic block 1. The cover 33 protects the cylinder cover 16 and the valve domes 31 from dirt and moisture; consequently, the cylinder cover 16 and the valve dome 31 do not have to be made of a corrosion-resistant steel. The cover 33 comprises an electronic control unit 34 for controlling or regulating the power brake pressure generator 10, the solenoid valves 30, and the other hydraulic components, i.e. for regulating the brake pressure of the power brake system.

The invention claimed is:

1. A hydraulic block for a hydraulic power brake system, the hydraulic block having a power cylinder bore which is open on a first side of the hydraulic block, and a tubular cylinder cover which extends the power cylinder bore is disposed on a second side opposite to the first side of the hydraulic block, the cylinder cover being connected to the hydraulic block in a pressure-tight manner using a circumferential caulking, wherein the hydraulic block has a greater coefficient of thermal expansion than the cylinder cover.

2. The hydraulic block according to claim 1, wherein, on an end facing the hydraulic block, the cylinder cover includes a circumferential fastening flange which is disposed in a depression in the second side of the hydraulic block, and that the circumferential caulking overlaps the fastening flange of the cylinder cover.

3. The hydraulic block according to claim 2, wherein the fastening flange of the cylinder cover is disposed in a circumferential fastening groove of the hydraulic block which encloses a mouth of the power cylinder bore in the second side of the hydraulic block, and the fastening flange of the cylinder cover abuts inside and outside of circumferential groove sidewalls of the fastening groove with an interference fit.

4. The hydraulic block according to claim 1, wherein an inner diameter of the cylinder cover is at least as large as a guide diameter or a sealing diameter of the power cylinder bore in the hydraulic block.

5. The hydraulic block according to claim 1, wherein a cylinder cover base of the cylinder cover includes a stiffener.

6. A hydraulic block for a hydraulic power brake system, the hydraulic block having a power cylinder bore which is open on a first side of the hydraulic block, and a tubular cylinder cover which extends the power cylinder bore is disposed on a second side opposite to the first side of the hydraulic block, the cylinder cover being connected to the hydraulic block in a pressure-tight manner using a circumferential caulking, wherein a cylinder cover base of the cylinder cover includes a stiffener, wherein the cylinder cover base of the cylinder cover and/or a power piston which can be displaced axially in the power cylinder bore includes an axial stop for the power piston which limits an axial displacement of the power piston in a direction of the cylinder cover base and is disposed close to an edge of a circumferential wall of the cylinder cover.

7. A hydraulic block for a hydraulic power brake system, the hydraulic block having a power cylinder bore which is open on a first side of the hydraulic block, and a tubular cylinder cover which extends the power cylinder bore is disposed on a second side opposite to the first side of the hydraulic block, the cylinder cover being connected to the hydraulic block in a pressure-tight manner using a circumferential caulking, wherein, on an end facing the hydraulic block, the cylinder cover includes a circumferential fastening flange which is disposed in a depression in the second side of the hydraulic block, and that the circumferential caulking overlaps the fastening flange of the cylinder cover, wherein the fastening flange of the cylinder cover includes a circumferential annular step on an outer edge facing away from a base of the fastening groove.

8. A hydraulic block for a hydraulic power brake system, the hydraulic block having a power cylinder bore which is open on a first side of the hydraulic block, and a tubular cylinder cover which extends the power cylinder bore is disposed on a second side opposite to the first side of the hydraulic block, the cylinder cover being connected to the hydraulic block in a pressure-tight manner using a circumferential caulking, wherein the fastening flange of the cylinder cover is disposed in a circumferential fastening groove of the hydraulic block which encloses a mouth of the power cylinder bore in the second side of the hydraulic block, and the fastening flange of the cylinder cover abuts inside and outside of circumferential groove sidewalls of the fastening groove with an interference fit, wherein a brake line in the hydraulic block opens into a passage at a base of the fastening groove and the passage connects the brake line to an interior space of the cylinder cover on an inner side of the cylinder cover.

9. The hydraulic block according to 8, wherein the passage is configured as a slot which extends in circumferential direction at a base of the fastening groove.

10. The hydraulic block according to claim 9, wherein the passage communicates with the interior space of the cylinder cover via an opening which extends obliquely to the power cylinder bore at an inner groove side wall of the fastening groove.

11. A hydraulic block for a hydraulic power brake system, the hydraulic block having a power cylinder bore which is open on a first side of the hydraulic block, and a tubular cylinder cover which extends the power cylinder bore is disposed on a second side opposite to the first side of the hydraulic block, the cylinder cover being connected to the hydraulic block in a pressure-tight manner using a circumferential caulking, wherein a cover which covers the cylinder cover is disposed on the second side of the hydraulic block.

* * * * *